(12) United States Patent
Sakuraoka

(10) Patent No.: US 8,862,427 B2
(45) Date of Patent: Oct. 14, 2014

(54) TRAVELING STATE DETERMINING DEVICE, METHOD FOR DETERMINING TRAVELING STATE AND RECORDING MEDIUM

(75) Inventor: Satoshi Sakuraoka, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 423 days.

(21) Appl. No.: 13/107,099

(22) Filed: May 13, 2011

(65) Prior Publication Data

US 2011/0282620 A1 Nov. 17, 2011

(30) Foreign Application Priority Data

May 14, 2010 (JP) .................................. 2010-111625
Nov. 8, 2010 (JP) .................................. 2010-249322

(51) Int. Cl.
- *G06F 15/00* (2006.01)
- *G01C 21/12* (2006.01)
- *G01C 21/34* (2006.01)

(52) U.S. Cl.
CPC ............ *G01C 21/12* (2013.01); *G01C 21/3423* (2013.01)
USPC .............................. 702/141; 701/19; 701/29.6

(58) Field of Classification Search
USPC ............................ 702/141; 701/202, 200, 213
See application file for complete search history.

(56) References Cited

U.S. PATENT DOCUMENTS

| | | | |
|---|---|---|---|
| 6,539,336 B1* | 3/2003 | Vock et al. | 702/182 |
| 7,057,551 B1* | 6/2006 | Vogt | 342/357.57 |
| 7,366,612 B2* | 4/2008 | Yang et al. | 701/504 |
| 7,712,365 B1* | 5/2010 | James | 73/488 |
| 7,725,289 B2* | 5/2010 | Nagashima et al. | 702/160 |
| 8,065,508 B2 | 11/2011 | Rubin et al. | |
| 8,438,373 B2 | 5/2013 | Rubin et al. | |
| 8,464,036 B2 | 6/2013 | Rubin et al. | |
| 2007/0073514 A1* | 3/2007 | Nogimori et al. | 702/160 |
| 2007/0265770 A1* | 11/2007 | Hirose | 701/202 |

(Continued)

FOREIGN PATENT DOCUMENTS

| | | |
|---|---|---|
| JP | 2002-048589 A | 2/2002 |
| JP | 2009-204429 A | 9/2009 |
| WO | WO 2005/096597 A1 | 10/2005 |
| WO | WO 2009/062176 A2 | 5/2009 |

OTHER PUBLICATIONS

Extended European Search Report (EESR) dated Mar. 11, 2013 (in English) issued in counterpart European Application No. 11165780.5.

(Continued)

*Primary Examiner* — Andrew Schechter
*Assistant Examiner* — Daniel Kessie
(74) *Attorney, Agent, or Firm* — Holtz, Holtz, Goodman & Chick PC

(57) ABSTRACT

Disclosed is a traveling state determining device including an acceleration sensor which detects an acceleration, a cycle comparing unit which compares a varying cycle of an acceleration of a vertical direction component in an output of the acceleration sensor to a varying cycle of an acceleration of a horizontal direction component and a state determining unit which determines between a state where a user is walking or running by wearing or retaining the traveling state determining device on a body of the user and a state where the user is walking or running by holding the traveling state determining device in a hand of the user based on the comparing result of the cycle comparing unit.

6 Claims, 9 Drawing Sheets

(56) References Cited

U.S. PATENT DOCUMENTS

| | | | |
|---|---|---|---|
| 2008/0281234 A1* | 11/2008 | Goris et al. | 600/595 |
| 2009/0069724 A1* | 3/2009 | Otto et al. | 600/595 |
| 2011/0032105 A1* | 2/2011 | Hoffman et al. | 340/573.1 |
| 2011/0160996 A1* | 6/2011 | Terai et al. | 701/200 |
| 2012/0303319 A1* | 11/2012 | Kirkeby | 702/160 |
| 2013/0232324 A1 | 9/2013 | Rubin et al. | |

OTHER PUBLICATIONS

Japanese Office Action dated Aug. 20, 2013 (and English translation thereof) in counterpart Japanese Application No. 2010-249322.

* cited by examiner

FIG. 13

| DATE (YEAR/MONTH/DAY) | YYYY:MM:DD(DATE IN WESTERN CALENDAR) |
|---|---|
| TIME | hh:mm:ss (HOUR/MINUTE/SECOND) |
| LATITUDE | dd (DEGREE) |
| LONGITUDE | dd (DEGREE) |
| HEIGHT | h (m) |
| GPS ACCURACY | PDOP, HDOP/POSITIONING NOT CARRIED OUT |
| NECESSITY OF GPS CORRECTION | 0/9 (0:POSITIONING BY GPS ALONE/ 9:POSITION BY AUTONOMOUS NAVIGATION) |
| STATE DETERMINATION | STOPPING/WALKING/RUNNING/BY CAR/BY TRAIN/OTHER |

# TRAVELING STATE DETERMINING DEVICE, METHOD FOR DETERMINING TRAVELING STATE AND RECORDING MEDIUM

BACKGROUND OF THE INVENTION

1. Field of the Invention

The present invention relates to a traveling state determining device which determines the traveling state of a user, a method for determining the traveling state and a recording medium.

2. Description of Related Art

Conventionally, there is a device which measures the present position and the traveling rout of a traveling body.

Further, JP2002-048589 discloses a technique for specifying the traveling state and the transportation option, for example, walking, running, bicycle, vehicle, bus, train or the like, of a traveling body based on an output from an acceleration sensor and the power spectrum thereof in the above device.

In a device which measures the traveling rout, the ability to discriminate between riding in a train and riding in a car is very useful.

For example, the traveling is to be on a relatively free rout when riding in a car. On the other hand, the traveling is to be on a predetermined train track when riding in a train.

Therefore, when the state of riding in a train and the state of riding in a car can be discriminated from each other, there is an advantage that the method for specifying the traveling rout can be changed according to the discrimination. Further, there is an advantage that the traveling rout can be specified by relying on the train tracks when the traveling is by riding in a train.

Moreover, such discrimination is useful when recording the transportation option which was used for the traveling along with the traveling rout and when outputting and displaying the traveling rout by discriminating the transportation options which were used.

However, there is a problem that it is difficult to accurately detect the transportation options such as a train and a car.

Moreover, in a device which detects the walking state and the running state of a user by using an acceleration sensor or the like, the accuracy of the state detection varies greatly between when the device is being worn or retained on the body of a user such as being carried in a pocket and when the device is being held in a hand of a user.

When the device is being worn or retained on the body of a user, the moving state can be detected relatively accurate. On the other hand, when the device is being held in a hand of a user, there is a problem that it is difficult to detect the moving state accurately.

SUMMARY OF THE INVENTION

An object of the present invention is to provide a traveling state determining device which can determine the traveling state of a user, specifically, to provide a traveling state determining device which can determine whether a user is in a traveling state of riding in a transportation option which runs on rails or in a traveling state of riding in a transportation option which runs on roads, a method for determining the traveling state of a user and a recording medium.

Further, another object of the present invention is to provide a traveling state determining device which can determine whether the device is in a state of being worn or retained on the body of a user or in an abnormal state of being held in a hand of a user, a method for determining the traveling state and a recording medium.

In order to achieve at least one of the above objects, in one aspect of the present invention, there is provided a traveling state determining device which determines a traveling state of a user including an acceleration sensor which detects an acceleration, an specific acceleration extracting unit which extracts an acceleration of a lateral direction component, being lateral with respect to a traveling direction, which is a predetermined frequency component from an output of the acceleration sensor and a state determining unit which determines between a state of traveling by a transportation option which travels on rails and a state of traveling by a transportation option which travels on roads based on a level of the acceleration which is extracted by the specific acceleration extracting unit.

In order to achieve at least one of the above objects, in one aspect of the present invention, there is provided a traveling state determining device including an acceleration sensor which detects an acceleration, a cycle comparing unit which compares a varying cycle of an acceleration of a vertical direction component in an output of the acceleration sensor to a varying cycle of an acceleration of a horizontal direction component and a state determining unit which determines between a state where a user is walking or running by wearing or retaining the traveling state determining device on a body of the user and a state where the user is walking or running by holding the traveling state determining device in a hand of the user based on the comparing result of the cycle comparing unit.

In order to achieve at least one of the above objects, in one aspect of the present invention, there is provided a traveling state determining method for determining a traveling state of a user by using an acceleration sensor including extracting a specific acceleration of a lateral direction component, being lateral with respect to a traveling direction, which is a predetermined frequency component from an output of the acceleration sensor and determining between a state of traveling by a transportation option which travels on a rail and a state of traveling by a transportation option which travels on a road based on a level of the acceleration extracted in the extracting.

In order to achieve at least one of the above objects, in one aspect of the present invention, there is provided a traveling state determining method for determining a traveling state of a user by using an acceleration sensor including comparing a varying cycle of an acceleration of a vertical direction component and a varying cycle of an acceleration of a horizontal direction component in an output of the acceleration sensor and determining that a user is in a state of walking or running wherein the acceleration sensor is worn or retained on a body of the user when the varying cycles do not differ from each other by a predetermined amount or more as a result of the comparing and that the user is in an abnormal state when the varying cycles differ from each other by the predetermined amount or more as the result of the comparing.

In order to achieve at least one of the above objects, in one aspect of the present invention, there is provided a recording medium recording a program for making a computer determine a traveling state of a user, an output of an acceleration sensor being provided to the computer, wherein the program makes the computer realize a specific acceleration extracting function to extract an acceleration of a lateral direction component, being lateral with respect to a traveling direction, which is a predetermined frequency component from the output of the acceleration sensor, and a state determining function to determine between a state of traveling by a transportation option which travels on a rail and a state of traveling by a transportation option which travels on a road based on a level of the acceleration extracted by the specific acceleration extracting function.

In order to achieve at least one of the above objects, in one aspect of the present invention, there is provided a recording medium recording a program for making a computer determine a traveling state of a user, an output of an acceleration sensor being provided to the computer, wherein the program makes the computer realize a cycle comparing function to compare a varying cycle of an acceleration of a vertical direction component and a varying cycle of an acceleration of a horizontal direction component in the output of the acceleration sensor, and a cycle determining function to determine that a user is in a state of walking or running wherein the acceleration sensor is worn or retained on a body of the user when the varying cycles do not differ from each other by a predetermined amount or more as a result of the cycle comparing function and to determine that the user is in an abnormal state when the varying cycles differ from each other by the predetermined amount or more as the result of the cycle comparing function.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 13 is a data chart showing traveling history data of one positioning process to be stored in a storage unit for moving history data.

DESCRIPTION OF THE PREFERRED EMBODIMENT

Hereinafter, an embodiment of the present invention will be described based on the drawings.

Figure 1:
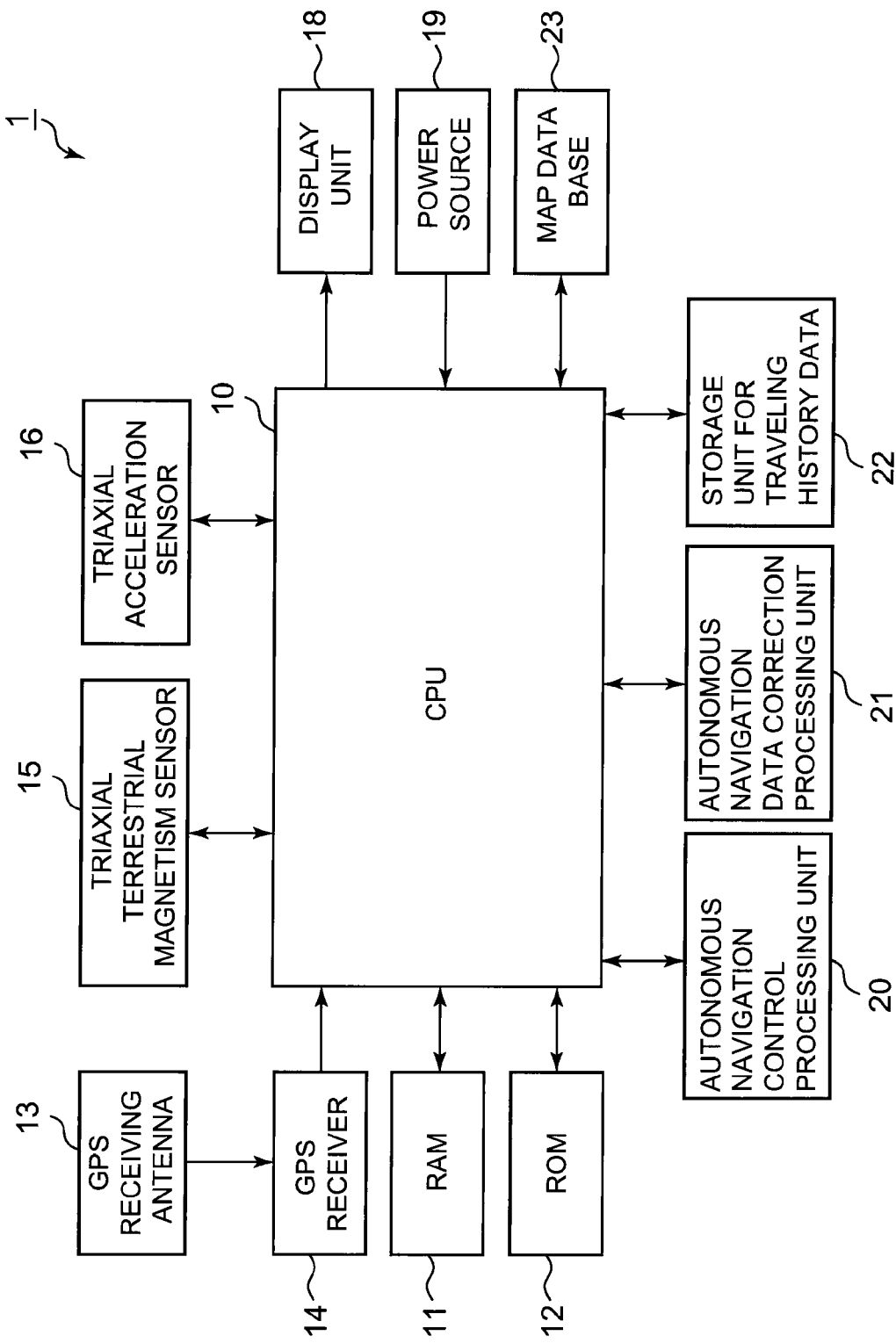
FIG. 1 is a block diagram showing an overall configuration of a navigation device of an embodiment of the present invention.

FIG. 1 is a block diagram showing an overall configuration of a navigation device according to the embodiment of the present invention, which has a function as a device for determining the traveling state.

The navigation device 1 of the embodiment is a device which displays the traveling track on a display of a map by carrying out a positioning by GPS (Global Positioning System) or a positioning by an autonomous navigation sensor when a user travels on her/his foot or by riding on a transportation option in a state where the navigation device 1 is worn by a user.

Further, the navigation device 1 functions as a traveling state determining device to determine the traveling state of a user (such as, walking, running, a state where walking or running cannot be detected because the device is held in a hand of a user, traveling on a train and traveling in a car).

As shown in FIG. 1, the navigation device 1 includes a CPU (Central Processing Unit) 10 which carries out an overall control of the device, a RAM (Random Access Memory) 11 which provides a memory space for working to the CPU 10, a ROM (Read Only Memory) 12 in which control programs and control data are stored, a GPS receiving antenna 13 which receives radio waves which are transmitted from a GPS satellite, a GPS receiver 14 which captures and decodes a signal which is transmitted from the GPS satellite, a triaxial terrestrial magnetism sensor 15 which detects the level of terrestrial magnetism in each of triaxial directions, a triaxial acceleration sensor 16 which detects the level of acceleration in each of triaxial directions, a display unit 18 which can display an image, a power source 19 which supplies operating voltage to each unit, an autonomous navigation control processing unit 20 which carries out a positioning calculation by autonomous navigation based on output data of the triaxial terrestrial magnetism sensor 15 and the triaxial acceleration sensor 16, an autonomous navigation data correction processing unit 21 which carries out a calculation process for correcting positioning results obtained by autonomous navigation previously when a positioning by GPS is carried out, a storage unit 22 for traveling history data the storage unit 22 being formed of a non-volatile memory and which stores the results of positioning by GPS and positioning by autonomous navigation, a map data base 23 in which data for displaying a map as an image is stored and such like.

The triaxial acceleration sensor 16 is fixed in a case of the navigation device 1.

Therefore, the triaxial acceleration sensor 16 changes the output of each of triaxial directions according to the direction of the navigation device 1.

Further, the CPU 10 estimates the vertical direction of the triaxial acceleration sensor 16 by detecting and taking average of the directions by which the level of gravitational acceleration can be obtained.

Here, the traveling direction of the navigation device 1 is the direction in which a user is walking or running when a user is traveling by walking or running on the roads, and the traveling direction of the navigation device 1 is the direction in which the transportation option is traveling when a user is traveling by a transportation option.

When walking or running (traveling on foot), the triaxial acceleration sensor 16 outputs a varying pattern which expresses the up-and-down movement of the body.

Moreover, when a user is in a stopped state or when traveling on a transportation option, the triaxial acceleration sensor 16 does not output the varying pattern of the up-and-down movement of the body.

Therefore, the CPU 10 can estimate whether a user is in a walking/running state or in other state by discriminating the outputs of the triaxial acceleration sensor.

Further, when a user is traveling on a transportation option, the CPU 10 can estimate the traveling direction by detecting an output of the acceleration sensor 16 of a certain duration which is a certain amount or more, that appears at the time of starting and stopping of the transportation option.

Furthermore, the CPU 10 can estimate the lateral direction (the direction perpendicular to the traveling direction in a horizontal plane) from the estimation result of the traveling direction and the estimation result of the vertical direction.

The triaxial terrestrial magnetism sensor 15 is fixed in the case of the navigation device 1.

Therefore, the direction of magnetic north of the navigation device 1 can be specified based on the output of the triaxial terrestrial magnetism sensor 15.

Further, when walking or running (traveling on foot), the triaxial acceleration sensor 16 outputs a varying pattern which expresses the forward inclining and backward inclining of the body and the rolling movement in right and left of the body.

In particular, the varying pattern which varies greatly in the vertical direction that expresses the forward inclining and backward inclining and the varying pattern which varies slightly in the lateral direction (the direction perpendicular to the traveling direction in a horizontal plane) that expresses the rolling movement are overlapped in the output of the triaxial acceleration sensor 16.

Therefore, by combining the above varying pattern, the estimation result of the vertical direction based on the output of the triaxial acceleration sensor 16 and the estimated result of the magnetic north direction by the triaxial terrestrial magnetism sensor 15, the CPU 10 can estimate the traveling direction and the lateral direction (the direction perpendicular to the traveling direction in a horizontal plane) when a user is walking and running.

The autonomous navigation control processing unit 20 is a calculation circuit for supporting the calculation process of the CPU 10, in which the measured data of the triaxial terrestrial magnetism sensor 15 and the triaxial acceleration sensor 16 which are measured at a predetermined sampling cycle are inputted via the CPU 10.

When a user is walking or running, the autonomous navigation control processing unit 20 calculates the traveling direction and the traveling amount of the navigation device 1 from the above measured data.

In detail, the autonomous navigation control processing unit 20 counts the number of steps of a user based on the measurement result of the change in up-and-down direction acceleration by the triaxial acceleration sensor 16, and multiplies the counted number of steps by the stride data of walking or running which is set in advance. Thereby, the autonomous navigation control processing unit 20 obtains the comparative traveling amount.

Moreover, the autonomous navigation control processing unit 20 obtains the direction of the navigation device 1 based on the estimation result of the direction of gravity by the triaxial acceleration sensor 16 and the measurement result of the magnetic north direction by the triaxial terrestrial magnetism sensor 15.

Further, the autonomous navigation control processing unit 20 calculates the traveling direction (direction) of a user from the direction of the navigation device 1 and the estimation result of the traveling direction based on the varying pattern of the output of the triaxial acceleration sensor 16.

Furthermore, the autonomous navigation control processing unit 20 obtains the position data of each point along the traveling rout by integrating the vector data constituted of the traveling amount and the traveling direction which are obtained as described above and the position data of the base point which is provided from the CPU 10.

The autonomous navigation data correction processing unit 21 is a calculation circuit for supporting the calculation process of the CPU 10.

The autonomous navigation data correction processing unit 21 carries out a calculation to correct the error of the position data obtained by the autonomous navigation, that has a characteristic of accumulating errors, every time the positioning by GPS is carried out.

In particular, the autonomous navigation data correction processing unit 21 obtains the accurate position data by carrying out the positioning by GPS at regular intervals.

Further, the autonomous navigation data correction processing unit 21 makes the start point and the end point of the series of position data measured by the autonomous navigation in the intervals between the positioning by GPS match the position data obtained by the positioning by GPS.

Furthermore, the autonomous navigation data correction processing unit 21 calculates data value for each position data in the series of position data measured by the positioning by autonomous navigation.

According to such error correction, with respect to the position data measured by the positioning by autonomous navigation, the position data in the intervals between the positioning by GPS are also continuously corrected so that the errors are to be zero at the points where positioning is carried out by GPS. Therefore, the position data are to be corrected so as to have very small errors as a whole.

In the ROM 12, a program for the positioning process and a program for the user's state determining process are stored.

The program for the positioning process is a program to selectively and continuously execute the positioning by GPS or the positioning by autonomous navigation to accumulate a plurality of positional data that show the traveling history.

The program for the user's state determining process is a program for determining the traveling state of a user in the positioning process.

These programs are stored in the ROM 12, and alternatively, they can be stored in a portable storage medium such as an optical disk and the like or a non-volatile memory such as a flash memory and the like which are readable by the CPU 10 via a data reading device.

Further, a configuration in which these programs are downloaded to the navigation device 1 via a communication circuit by using a carrier wave as a medium can be applied.

Next, the user's state determining process for determining the traveling state of a user which is executed in the navigation device 1 having the above configuration will be described.

Figure 2:
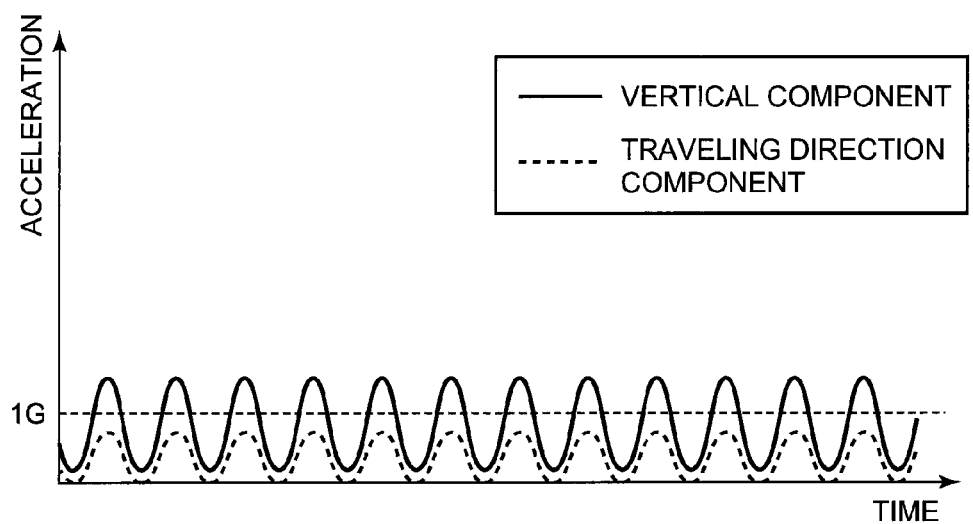
FIG. 2 is a waveform diagram showing an overview of change in acceleration when a user is walking in a state where the navigation device is worn on the body of a user.

In FIG. 2, a waveform diagram showing an overview of change in acceleration when a user is walking in a state where the navigation device 1 is worn or retained on the body of a user is shown.

Figure 3:
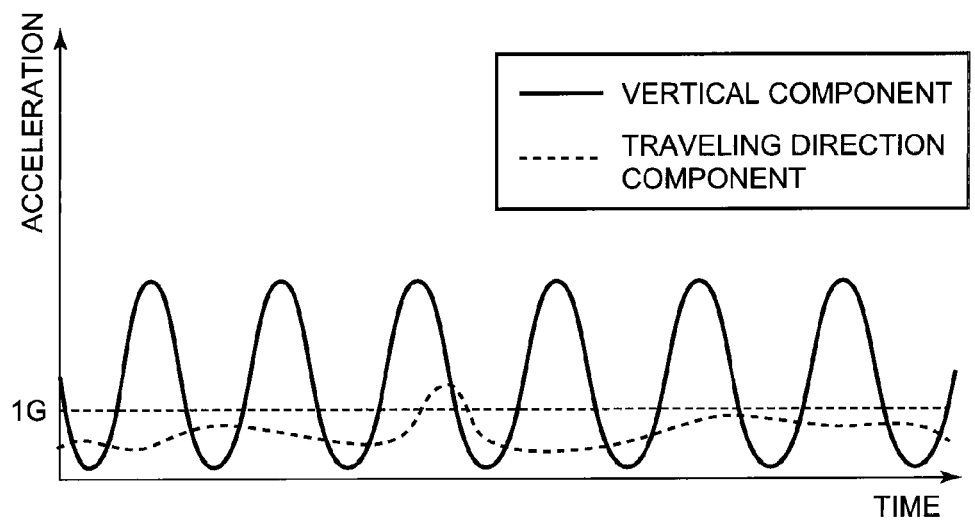
FIG. 3 is a waveform diagram showing an overview of change in acceleration when a user is walking in a state where the navigation device is being held in a hand of a user.

Further, in FIG. 3, a waveform diagram showing an overview of change in acceleration when a user is walking in a state where the navigation device 1 is held in a user's hand is shown.

In the user's state determining process, the CPU 10 analyses the measured data of the triaxial acceleration sensor 16.

Then, the CPU 10 determines whether the navigation device 1 is in a state where the movement detection of walking or running can be carried out wherein the navigation device 1 is worn or retained on the body of a user or in a state where the movement detection of walking or running cannot be carried out wherein the navigation device 1 is held in a hand of a user.

The CPU 10 carries out the above determination by comparing the varying cycle of the vertical direction component to the varying cycle of the traveling direction component in the measured data of the triaxial acceleration sensor 16.

The CPU 10 determines that the navigation device 1 is worn or retained on the body normally when the above varying cycles are roughly matching each other, and the CPU 10 determines that the navigation device 1 is in an abnormal state such as being held in a hand of a user or the like when the above varying cycles greatly differ from each other.

The CPU 10 obtains the vertical direction and the traveling direction by the method described in the description of the triaxial terrestrial magnetism sensor 15 and the triaxial acceleration sensor 16.

Further, the CPU 10 obtains the varying cycles by detecting the peaks of acceleration to calculate the time interval between the two neighboring peaks in each of the components, for example.

As shown in FIG. 2, when the navigation device 1 is worn or retained on the body of a user, the change in acceleration with the up-and-down movement of walking or running appears similarly in the vertical direction component and in the traveling direction component.

In particular, the change in acceleration in the vertical direction component is relatively large and the change in acceleration in the traveling direction component is relatively small. However, the varying cycles roughly match each other.

On the other hand, as shown in FIG. 3, when the navigation device 1 is held in a hand of a user when walking or running, the change in acceleration coupled with stepping disappears from the acceleration in the traveling direction because the change in acceleration due to moving of one arm is overlapped with the change in acceleration with the up-and-down movement of walking or running.

Further, the varying cycle of acceleration in the vertical direction component and the varying cycle of acceleration in the traveling direction component greatly differ from each other.

Therefore, the CPU 10 can discriminate between the state where the navigation device 1 is worn or retained on the body of a user and the state where the navigation device 1 is held in a hand of a user when walking or running.

Here, when the navigation device 1 is worn or retained on the body of a user, a variance due to right and left feet stepping on the ground appears in the acceleration in the lateral direction (the direction perpendicular to the traveling direction in a horizontal plane) with respect to the traveling direction.

On the other hand, when the navigation device 1 is held in a hand of a user, the acceleration of at the time when the right and left feet stepping on the ground is buffered and the variance which expresses the movement of walking and running disappears from the acceleration in the lateral direction (the direction perpendicular to the traveling direction in a horizontal plane).

Therefore, the above discrimination between the state where the navigation device 1 is worn or retained on the body of a user and the state where the navigation device 1 is held in a hand of a user when walking or running can be similarly realized by comparing the varying cycle of the vertical direction component of acceleration to the varying cycle of any one of horizontal direction components of acceleration.

Figure 4:
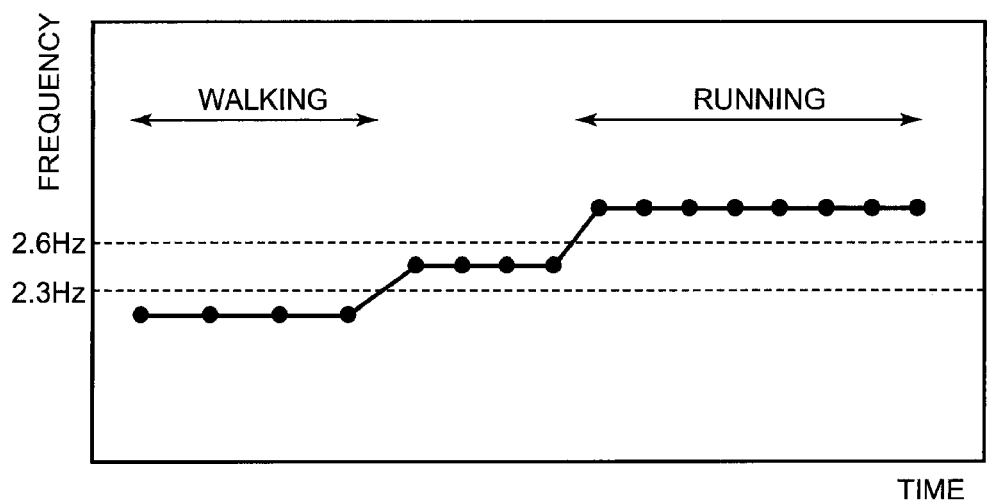
FIG. 4 is a graph showing a frequency change in the vertical direction component of acceleration between walking and running.

In FIG. 4, a graph showing a variable frequency in acceleration between walking and running is shown.

Figure 5:
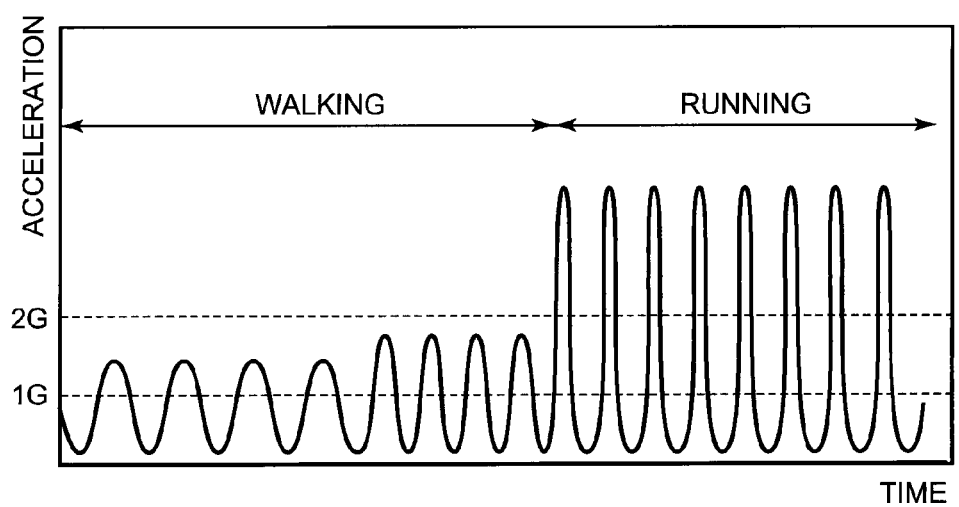
FIG. 5 is a waveform diagram showing a change in the level of vertical direction component of acceleration between walking and running.

In FIG. 5, a waveform diagram showing a change in acceleration between walking and running is shown.

When it is determined that the navigation device 1 is worn or retained on the body of a user in the above discrimination process, the CPU 10 determines whether a user is in a walking state or in a running state (traveling by running on foot) in the user's state determining process.

The CPU 10 carries out the determination based on the variable frequency of the vertical direction component (may be a horizontal direction component) which is obtained from the measured data of the triaxial acceleration sensor 16 and the level of the peak values of acceleration of the vertical direction component.

The CPU 10 first determines that a user is walking when the variable frequency is in the first range (for example, equal to or smaller than 2.3 Hz) which indicates walking as shown in FIG. 4.

Further, the CPU 10 determines that a user is running when the variable frequency is in the second range (for example, equal to or greater than 2.6 Hz) which indicates running.

The first range and the second range are set in advance in accordance with walking and running movement of human.

However, in a fast walking state (there is no period of time where both feet do not touch the ground) and in a slow running state (there is a period of time when both feet do not touch the ground), the variable frequency will be in a range between the upper limit value of the first range and the lower limit value of the second range.

Therefore, when the variable frequency in not included in the first range and in the second range, the CPU 10 compares the peak values of acceleration of the vertical direction component and a threshold value (for example, 2G: G is gravitational acceleration) which distinguishes between walking and running as shown in FIG. 5.

Then, the CPU 10 determines that a user is walking when the peak values are smaller than the threshold value and determines that a user is running when the peak values are greater than the threshold value.

Here, the peak values of acceleration of the vertical direction component vary so as to be large or small according to the hardness of the ground and the hardness of shoes and according to the way of walking and running.

Therefore, the discrimination between walking and running may result in a relatively inaccurate outcome when the discrimination is carried out only by the peak values of acceleration.

Therefore, as in the embodiment, the CPU 10 first carries out the discrimination between walking and running by the variable frequency of acceleration.

Then, the CPU 10 carries out the discrimination by referring to the peak values of acceleration when the discrimination cannot be made only by the variable frequency of acceleration. Thereby, a relatively accurate outcome can be obtained.

Figure 6:
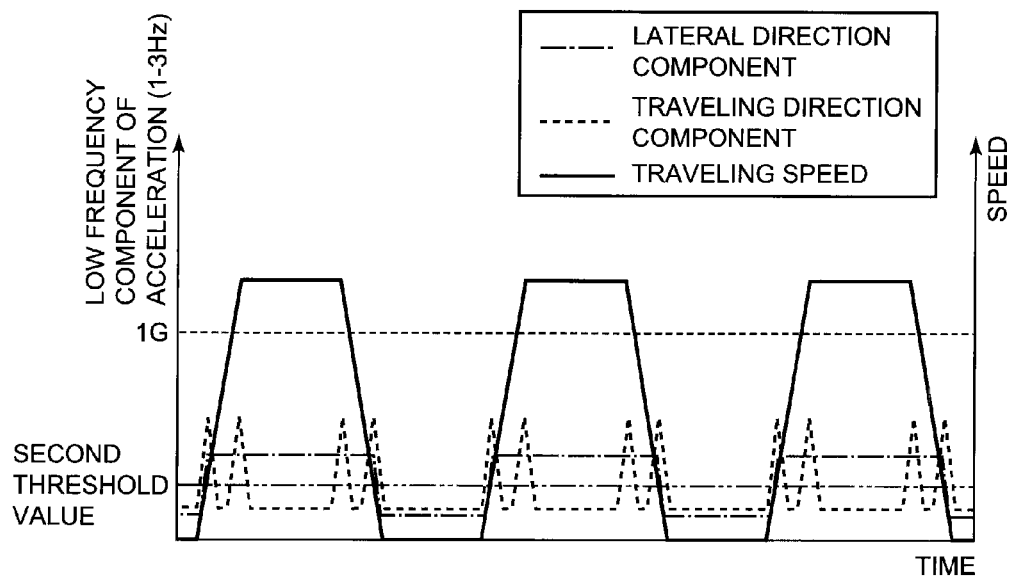
FIG. 6 is a waveform diagram showing an overview of levels of low-frequency components of the traveling direction component of acceleration and the lateral direction component of acceleration, being lateral with respect to the traveling direction (direction perpendicular to the traveling direction in a horizontal plane) when traveling in a car.

In FIG. 6, a waveform diagram showing an overview of levels of low-frequency components of acceleration during traveling by car is shown.

Figure 7:
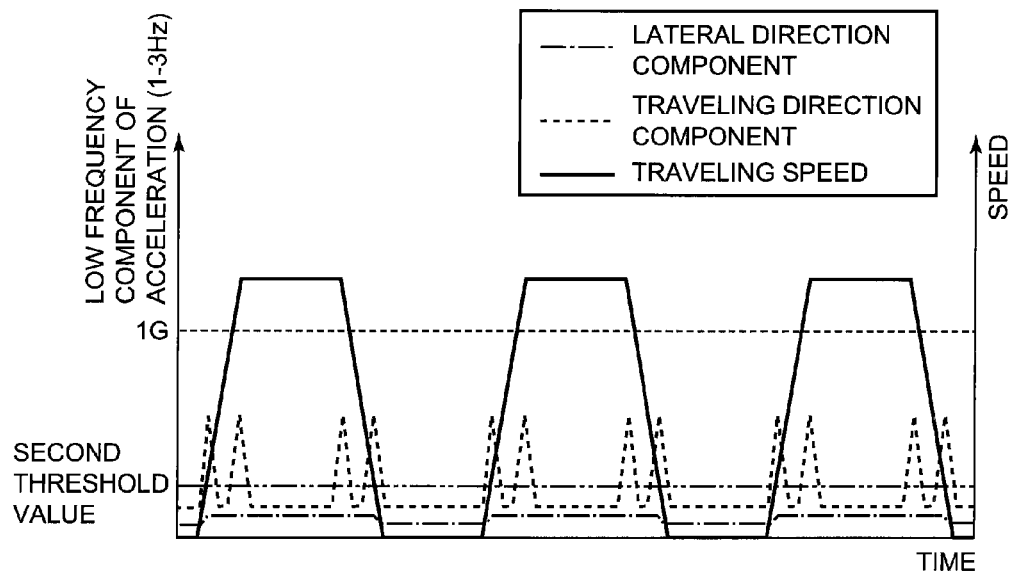
FIG. 7 is a waveform diagram showing an overview of levels of low-frequency components of the traveling direction component of acceleration and the lateral direction component of acceleration, being lateral with respect to the traveling direction (direction perpendicular to the traveling direction in a horizontal plane), when traveling on a train.

In FIG. 7, a waveform diagram showing an overview of levels of low-frequency components of acceleration during traveling by train is shown.

In the user's state determining process, the CPU 10 further discriminates between cases where a user is traveling by transportation options when the change in acceleration due to up-and-down movement which expresses walking or running of a user is not apparent in the output of the triaxial acceleration sensor 16.

In particular, the CPU 10 discriminates between a traveling state by a car that travels on roads and a traveling state by a train that travels on rail.

When discriminating between car and train, the CPU 10 extracts the acceleration of the lateral direction (the direction perpendicular to the traveling direction in a horizontal plane) component, being lateral with respect to the traveling direction, which is the low-frequency component (for example, a variable component in the band of 1 Hz to 3 Hz) from the output of the triaxial acceleration sensor 16.

Then, the CPU 10 compares whether the level of the acceleration which is extracted when the transportation option is traveling exceeds the second threshold value (see FIGS. 6 and 7) or not.

Thereafter, the CPU 10 determines that the traveling is by car when the extracted acceleration exceeds the second threshold value, and the CPU 10 determines that the traveling is by train when the extracted acceleration does not exceed the second threshold value.

Here, the CPU 10 obtains the traveling direction of when the transportation option is traveling by the method described in the part that described the triaxial acceleration sensor 16.

Further, the CPU 10 extracts the level of acceleration of the low-frequency component by obtaining the peak of the signal component in a predetermined low-frequency band by carrying out the fourier transformation to the acceleration data of a certain time period and by integrating the amount of the signal in the predetermined low-frequency band.

FIG. 6 shows an example where a car repeats traveling and stopping by increasing and decreasing its traveling speed (bold solid line).

As shown in FIG. 6, at the time of starting of acceleration and at the time of transition to the constant speed state from the acceleration state, variance of low-frequency (bold dashed line) appears greatly in the traveling direction acceleration.

Further, in a transportation option that travels on roads such as a car, the low-frequency component of acceleration (bold dashed-dotted line) in the lateral direction (the direction perpendicular to the traveling direction in a horizontal plane) is large when traveling.

That is, when traveling, vibration in the lateral direction (the direction perpendicular to the traveling direction in a horizontal plane) occurs almost all the time. This vibration appears as the low-frequency component of acceleration in the lateral direction (the direction perpendicular to the traveling direction in a horizontal plane).

FIG. 7 shows an example where a train repeats traveling and stopping by increasing and decreasing its traveling speed (bold solid line).

As shown in FIG. 7, at the time of starting of acceleration and at the time of transition to the constant speed state from the acceleration state, variance in low-frequency (bold dashed line) appears greatly in the acceleration in the traveling direction similarly to the case of a car.

Further, in a transportation option that travels on rails such as a train, the low-frequency component of acceleration (bold dashed line) in the lateral direction (the direction perpendicular to the traveling direction in a horizontal plane) does not become large when traveling as in the case of a car.

That is, the vibration in the lateral direction (the direction perpendicular to the traveling direction in a horizontal plane) does not become large even when traveling and the low-frequency component of acceleration in the lateral direction (the direction perpendicular to the traveling direction in a horizontal plane) remains small.

Therefore, as shown in FIGS. 6 and 7, the CPU 10 sets the second threshold value in between the level of low-frequency component of acceleration in the lateral direction (the direction perpendicular to the traveling direction in a horizontal plane) which appears in the case of traveling in a car and the level of low-frequency component of acceleration in the lateral direction (the direction perpendicular to the traveling direction in a horizontal plane) which appears in the case of traveling on a train.

As described above, the CPU 10 can discriminate between the traveling state by a car and the traveling state by a train by comparing the level of low-frequency component of acceleration in the lateral direction (the direction perpendicular to the traveling direction in a horizontal plane) to the second threshold value while the transportation option is traveling.

However, the above discrimination of transportation options cannot be carried out when the transportation option is stopping. Therefore, the CPU 10 executes the above discrimination along with detecting of the state where the transportation option is traveling as described below.

Figure 8:
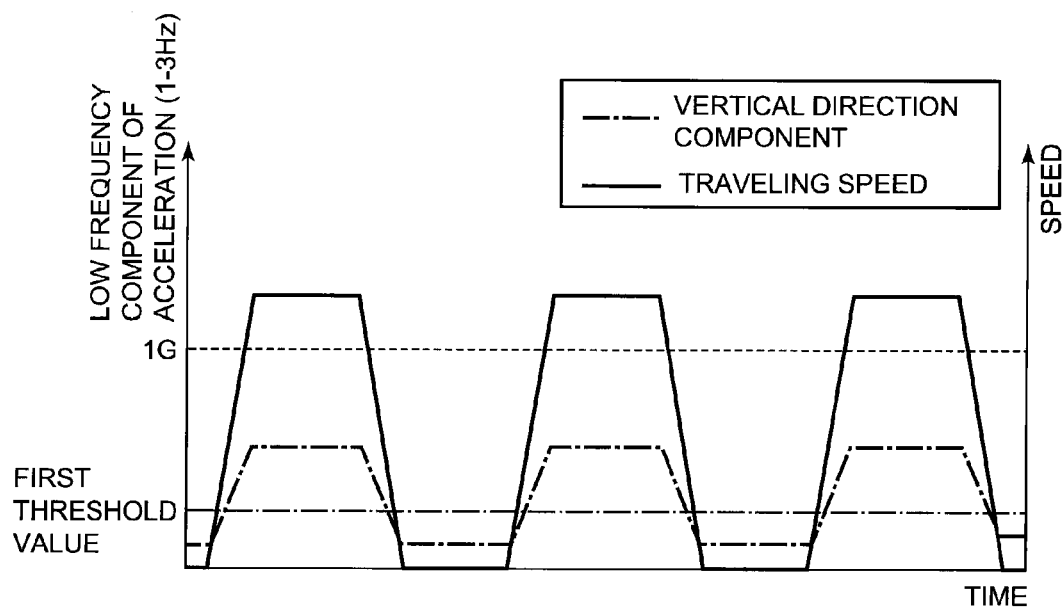
FIG. 8 is a waveform diagram showing an overview of level of low-frequency component of the vertical direction component of acceleration when traveling in a car.

In FIG. 8, a waveform diagram showing an overview of level of low-frequency component of acceleration in the vertical direction when traveling in a car is shown.

Figure 9:
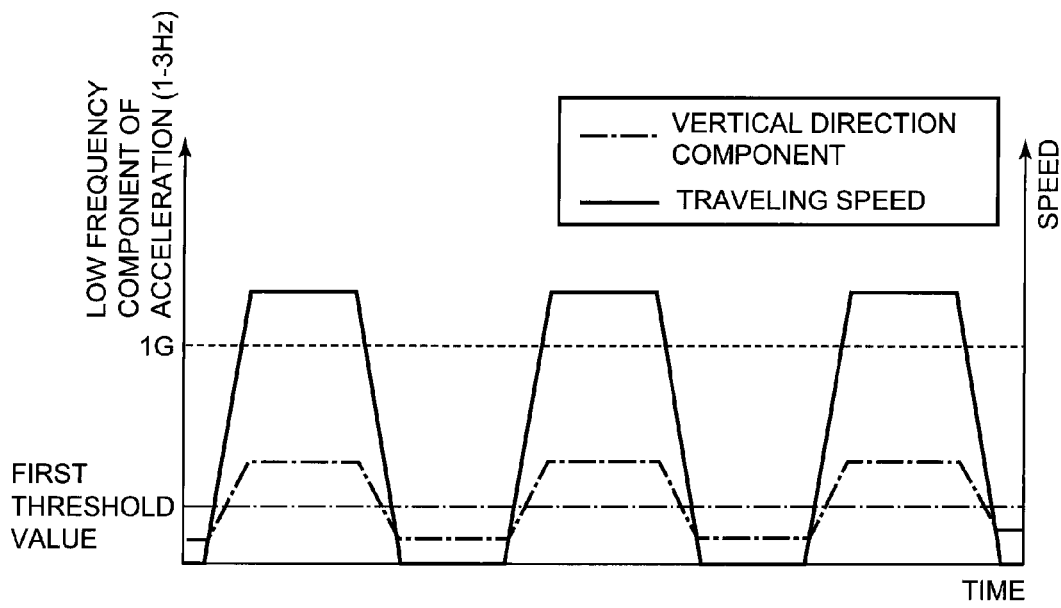
FIG. 9 is a waveform diagram showing an overview of level of low-frequency component of the vertical direction component of acceleration when traveling on a train.

In FIG. 9, a waveform diagram showing an outline of level of low-frequency component of acceleration in the vertical direction when traveling on a train is shown.

When detecting the state where the transportation option is traveling, the CPU 10 extracts the vertical direction component which is low-frequency component (for example, a variable component in a band of 1 Hz to 3 Hz) from the output of the triaxial acceleration sensor 16.

Then, the CPU 10 detects whether the transportation option is traveling or not by comparing the level of the extracted component to the first threshold value (see FIGS. 8 and 9) to see whether the level of the extracted component exceeds the first threshold value or not.

Thereafter, the CPU 10 determines that the transportation option is traveling when the level of the extracted component exceeds the first threshold value, and the CPU 10 determines that the transportation option is stopping when the level of the extracted component does not exceed the first threshold level.

As shown in FIG. 8 which shows the case of a car and FIG. 9 which shows the case of a train, the low-frequency component of acceleration (bold dashed-dotted line) in the vertical direction becomes large when traveling and becomes small when stopping in both cases.

That is, vibration in the vertical direction occurs almost all the time in the low-frequency component of acceleration in the vertical direction when traveling, and this vibration appears in the low-frequency component of acceleration in the vertical direction. On the other hand, the vibration almost disappears when the transportation option is stopping.

Therefore, the CPU 10 can detect the state where the transportation option is traveling by the method described above.

Further, here, the CPU 10 can discriminate whether the transportation option is a car or the like which travels on roads or is a train or the like which travels on rails by carrying out the discrimination of transportation option type as described above.

Next, the overall operation of the navigation device 1 of the embodiment will be described based on the flowchart.

Figure 10:
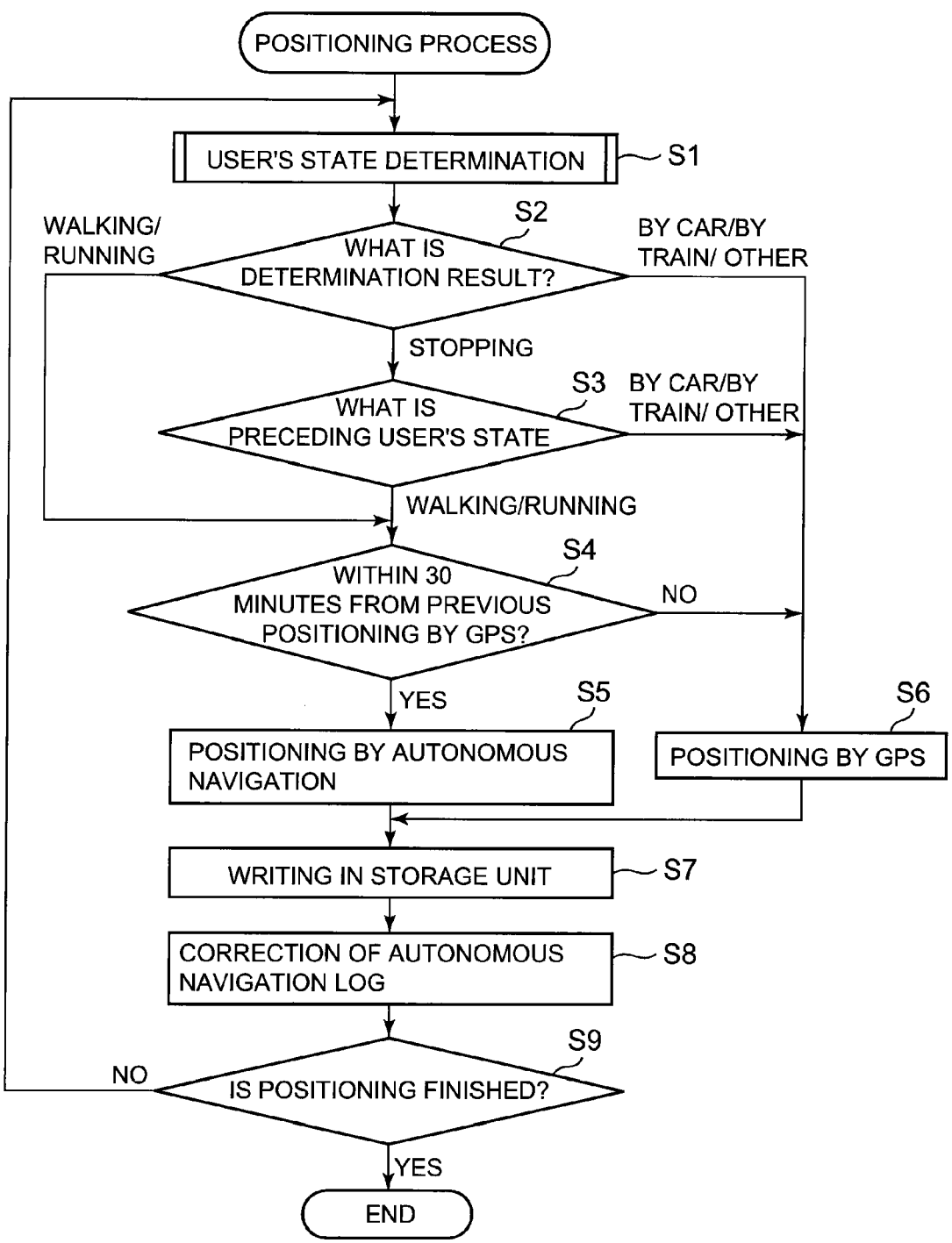
FIG. 10 is a flowchart showing a control procedure of a positioning process which is executed by a CPU.

In FIG. 10, a flowchart of the positioning process which is executed by the CPU 10 is shown.

The positioning process is a process which is executed continuously based on the starting request of the positioning process according to an operation and the like of a user.

When this positioning process is started, the CPU 10 first carries out the user's state determining process for determining the traveling state of a user (step S1).

The user's state determining process will be described later.

By the user's state determining process, the CPU 10 determines whether the traveling state of a user is walking, running, stopping or others (walking, running or other in a state where the navigation device 1 is held in a hand of a user) or whether it is traveling by a car or traveling by a train.

When the CPU 10 determines the traveling state, the CPU 10 carries out the branch process based on the determination result (step S2).

When the determination result is walking or running, the CPU 10 jumps to step S4. Further, the CPU 10 moves to step S3 when the determination result is stopping, and the CPU 10 moves to step S6 when the determination result is traveling by a car, traveling by a train or others.

When the CPU 10 moves to step S3 due to the determination result being stopping, the CPU 10 reads out the data of the traveling state which is determined in the positioning which was carried out just before from the storage unit 22 for traveling history data, and the CPU 10 carries out the branch process again based on the traveling state which is determined just before (step S3).

Here, when the determination result of the determination which is carried out just before is also the state of stopping, the data is tracked back in order until a determination result other than the state of stopping is found to obtain the determination result of the traveling state other than stopping. Then, the branch process is carried out based on the found determination result.

Thereafter, the CPU 10 moves to step S4 when the traveling state which is determined just before is walking or running, and the CPU 10 moves to step S6 when the traveling state which is determined just before is traveling by a car, traveling by a train or others.

When the CPU 10 moves to step S4 due to the determination result being walking or running, the CPU 10 confirms whether the present timing is within 30 minutes from the previous position by GPS, and the CPU 10 executes the positioning process by autonomous navigation (step S5) when the present timing is within 30 minutes from the previous positioning by GPS.

On the other hand, the CPU 10 executes the position process by GPS (step S6) when more than 30 minutes has elapsed since the previous positioning by GPS.

In the position process by autonomous navigation in step S5, the CPU 10 transmits the measured data of the triaxial terrestrial magnetism sensor 15 and the triaxial acceleration sensor 16 which has been taken as sample before now to the autonomous navigation control processing unit 20.

Then, the autonomous navigation control processing unit 20 obtains the traveling direction (direction) and the number of steps from the measured data.

Further, the autonomous navigation control processing unit 20 obtains the traveling amount by multiplying the number of steps by the stride data which is set in advance.

Thereafter, the autonomous navigation control processing unit 20 calculates the present position data by adding the travelling vector to the preceding position data and returns the calculated present position data to the CPU 10.

As for the stride data, a plurality of types such as a value for when walking and a value for when running are prepared, and the stride data according to the traveling state which is determined by the user's state determining process is to be used.

On the other hand, in the positioning process by GPS in step S6, the CPU 10 calculates the position data which indicates the absolute position by carrying out a predetermined positioning calculation based on transmitted data of GPS satellite and receiving timing of the positioning code which are supplied from the GPS receiving unit 14.

When the position process by autonomous navigation or GPS is carried out, thereafter, the CPU 10 adds attachment data to the position data and writes the position data to which the attachment data is added in the storage unit 22 for traveling history data as one of the traveling history data (step S7).

In FIG. 13, a data chart showing the traveling history data of one position process which is to be stored in the storage unit for traveling history data is shown.

As shown in FIG. 13, the traveling history data of one positioning process is constituted of the position data (latitude and longitude) which is obtained by positioning, date data (year, month, day), time data, height data, values of accuracy deterioration factors PDOP (Position Dilution of Precision) and HDOP (Horizontal Dilution of Precision) which indicate the positioning accuracy when the positioning is by GPS, data which indicates whether a correction based on the result of positioning by GPS is needed or not (whether it is a positioning data by autonomous navigation or a positioning data of GPS alone) and state determination data which indicates the determination result of the user's state determining process.

Then, the traveling history data of one positioning process is written in the storage unit 22 of traveling history data.

After the CPU 10 writes in the traveling history data in step S7, next, the CPU 10 confirms whether position data of autonomous navigation which needs to be corrected exists in the traveling history data when the preceding positioning is the position by GPS.

Then, when position data of autonomous navigation which needs to be corrected exists in the traveling history data, the CPU 10 gives a command to the autonomous navigation data correction processing unit 21 so as to carry out correction of the position data which need to be corrected (step S8).

The CPU 10 confirms whether finishing of the positioning process is requested or not based on an operation and the like of a user (step S9).

Then, when finishing of the positioning process is requested, the CPU 10 finishes the positioning process. However, when finishing of the positioning process is not requested, the CPU 10 returns to step S1 to repeat the process from step S1 again.

Figure 11:
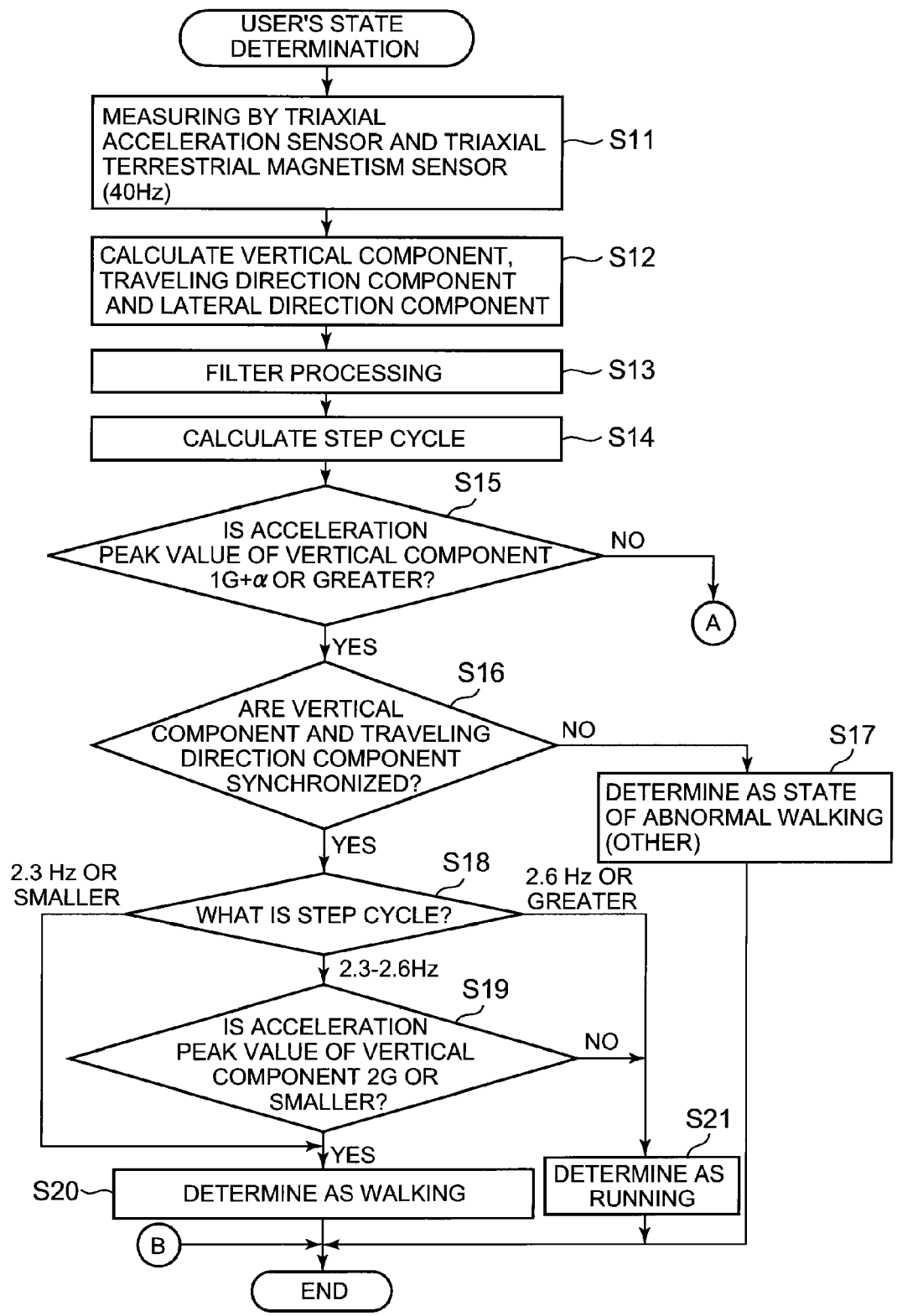
FIG. 11 is the first part of a flowchart which shows the control procedure of a user's state determining process in step S1 of FIG. 10.
Figure 12:
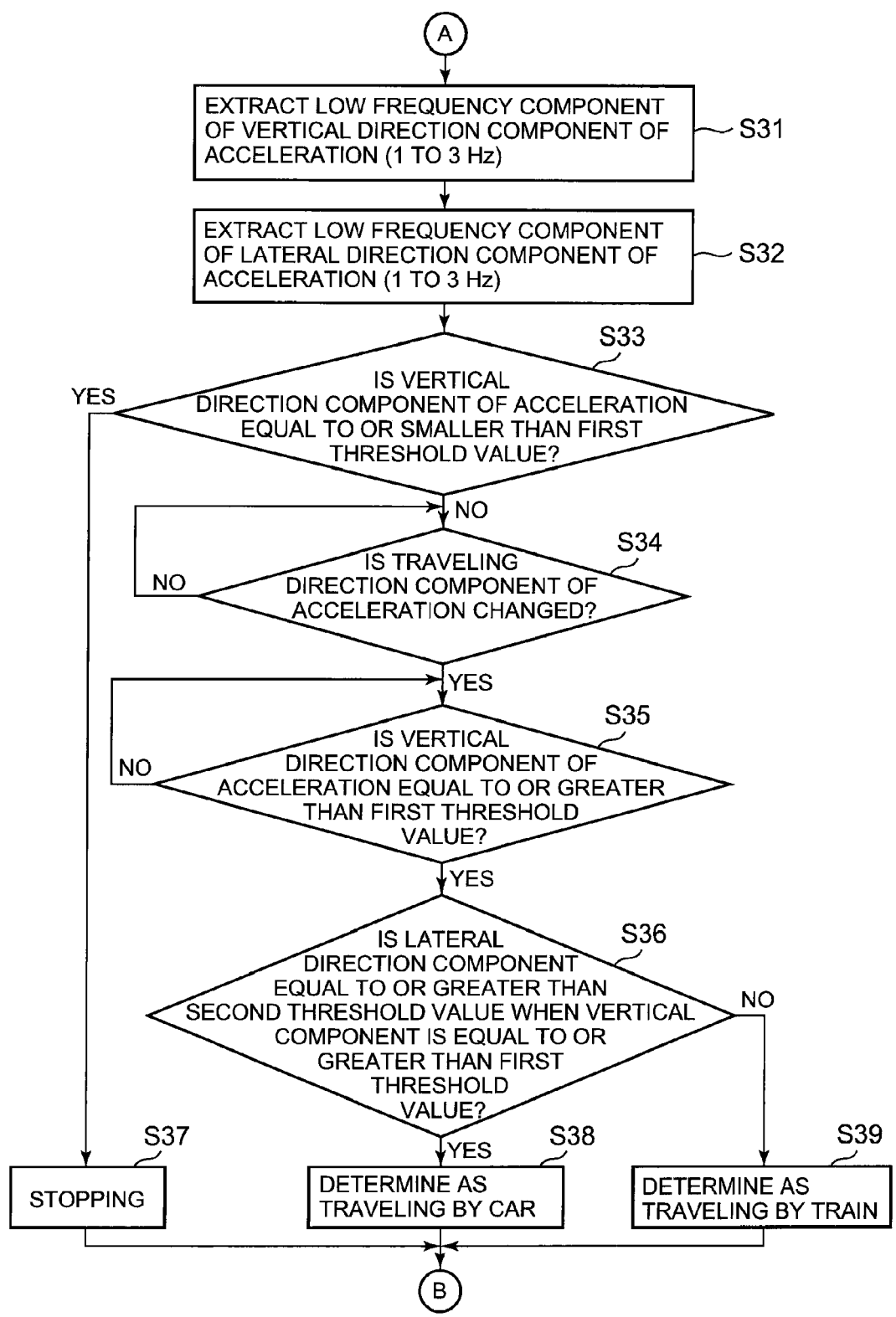
FIG. 12 is the second part of the flowchart of the user's state determining process in step S1 of FIG. 10.

In FIGS. 11 and 12, a flowchart of the user's state determining process which is executed in step S1 of the positioning process is shown.

When the procedure is moved to the user's state determining process, the CPU 10 first takes the output of the triaxial acceleration sensor 16 and the triaxial terrestrial magnetism sensor 15 as samples at a sampling frequency of 40 Hz, for example, for a predetermined time period to take in as digital measured data (step S11).

Then, the CPU 10 obtains the vertical direction, the traveling direction and the lateral direction (the direction perpendicular to the traveling direction in a horizontal plane) of the navigation device 1 based on the measured data.

Further, the CPU 10 carries out coordinate conversion to the measured data of the triaxial acceleration sensor 16 to calculate the vertical component, the traveling direction component and the lateral direction (the direction perpendicular to the traveling direction in a horizontal plane) component of acceleration (step S12: direction setting unit, traveling direction setting unit).

The way of obtaining each of the vertical direction, the traveling direction and the lateral direction (direction perpendicular to the traveling direction in a horizontal plane) is based on the estimation method which is described in the part where describes the triaxial acceleration sensor 16 and the triaxial terrestrial magnetism sensor 15.

Further, the CPU 10 carries out a filter process to remove noise component of high frequency to the measured data (step S13).

Moreover, the CPU 10 calculates the step cycle (cycle for one step) by measuring the time between peaks of acceleration of the vertical component (step S14).

Next, the CPU 10 determines whether the peak values of acceleration of the vertical component are equal to or greater than "1G+α" which is a value slightly greater than 1G or not (step S15: acceleration determining unit).

When the peak values of acceleration of the vertical component are equal to or greater than the value of "1G+α", the CPU 10 determines as walking or running (traveling by running on foot) and moves to the next process. On the other hand, when the peak values of acceleration of the vertical component are smaller than the value of "1G+α", the CPU 10 determines as not walking or running and moves to step S31.

As a result, when the CPU 10 proceeds to the next process due to the peak values being equal to or greater than "1G+α", the CPU 10 compares the varying cycle of acceleration of the vertical component to the varying cycle of acceleration of the traveling direction to determine whether they roughly match each other or not (step S16: cycle comparing unit).

In particular, the CPU 10 determines whether the varying cycles match each other in a range including acceptable errors due to noise and the like.

As a result, when the cycles do not match each other as shown in FIG. 3, the CPU 10 determines as an abnormal state (other state) such as a state where a user is walking or running by holding the navigation device 1 in his/her hand, for example (step S17).

Then, the CPU 10 finishes the user's state determining process.

On the other hand, when the procedure proceeds to the next process due to the varying cycles being determined as roughly matching each other n the determining process of step S16, the CPU 10 first determines whether the frequency corresponding value of the step cycle which is calculated in step S14 is in the first range (for example, equal to of smaller than 2.3 Hz), in the second range (for example, equal to or greater than 2.6 Hz) or in between the first range and the second range as described above by referring to FIG. 4 (step S18: cycle determining unit).

When it is determined as being in between the first range and the second range, the CPU 10 further determines whether the acceleration peaks of the vertical component are equal to or smaller than a predetermined threshold value (2G) or not as described above by referring to FIG. 5 (step S19: acceleration peak comparing unit).

Then, when the frequency corresponding value of the step cycle is equal to or smaller than 2.3 Hz, the CPU 10 determines that the traveling state of a user is walking (step S20).

Further, when the frequency corresponding value of the step cycle is equal to or greater than 2.6 Hz, the CPU 10 determines that the traveling state of a user is running (step S21).

Furthermore, when the frequency corresponding value of the step cycle is in between 2.3 Hz and 2.6 Hz, the CPU 10 determines that the traveling state of a user is walking when the peaks of acceleration of the vertical component is equal to or smaller than 2G (step S20).

Then, when the peaks of acceleration of the vertical component exceeds 2G, the CPU 10 determines that the traveling state of a user is running (step S21).

The state determining member is constituted of the determining processes of steps S17, S20 and S21 based on the determination result of step S16.

Moreover, the walking or running determining member is constituted by the processes of steps S18 to S21.

Then, when the traveling state of a user is determined, the user's state determining process is finished.

On the other hand, when the CPU 10 determines that the peak values of acceleration of the vertical component is smaller than "1G+α" in the above determining process of step S15, the CPU 10 jumps to step S31 (FIG. 12) to determine whether the state is any one of stopping, traveling by a car or traveling by a train.

After jumping, the CPU 10 first extracts the vertical direction component which is low-frequency (for example, 1 to 3 Hz) from the measured data of the triaxial acceleration sensor 16 of a predetermined time period which is obtained in step S11 (step S31).

Further, the CPU 10 extracts the lateral direction (the direction perpendicular to the traveling direction in a horizontal plane) component which is low-frequency (for example, 1 to 3 Hz) from the measured data (step S32: specific acceleration extracting unit).

Next, the CPU 10 determines whether the low-frequency component of the vertical direction acceleration which is extracted is equal to or smaller than the first threshold value for the whole period (see FIGS. 8 and 9) (step S33).

Then, the CPU 10 determines that the state is stopping state (walking or running is stopped, a transportation option is stopped for a predetermined time period) when the low-frequency component of the vertical direction acceleration is equal to or smaller than the first threshold value for the whole period (step S37).

On the other hand, when there is a period where the low-frequency component of the vertical direction acceleration is greater than the first threshold value, the procedure moves to the next process and the CPU 10 searches for a portion where a predetermined amount of change is occurring in the acceleration of the traveling direction component in the measured data of a predetermined time period which is obtained in step S11 (step S34).

That is, from the above process, the CPU 10 identifies the timing of starting or stopping and the switching timing to the constant speed state from the accelerating state of the transportation option.

Further, when the CPU 10 detected the above timing of the transportation option, next, the CPU 10 searches for a portion where the low-frequency component of the vertical direction acceleration is equal to or greater than the first threshold value in the low-frequency component of the vertical direction acceleration which is extracted in step S31 (step S35: traveling determining unit).

Thereafter, based on the search result of the above steps S34 and S35, the CPU 10 compares the low-frequency component of the lateral direction (the direction perpendicular to the traveling direction in a horizontal plane) acceleration to the second threshold value (FIGS. 6 and 7) during a period in which the transportation option is traveling in a constant speed state of at least a predetermined speed, in order to determine whether the acceleration is equal to or greater than the second threshold value (step S36).

The period where the transportation option is traveling in a constant speed state of at least a predetermined speed is the period between after switching to the constant speed state after the transportation option starts moving and before the stopping acceleration is started, that is a period where the low-frequency component of the vertical direction acceleration is equal to or greater than the first threshold value.

When the determination result of step S36 shows that the low-frequency component of the lateral direction acceleration is equal to or greater than the second threshold value, the CPU 10 determines that the traveling is by a car (step S38).

When the determination result of step S36 shows that the low-frequency component of the lateral direction acceleration is smaller than the second threshold value, the CPU 10 determines that the traveling is by a train (step S39).

The state determination member is constituted of the above processes of steps S36, S38 and S39.

When the determinations of steps S37 to S39 are carried out, the CPU 10 finishes the user's state determining process and moves to the next step in the positioning process (FIG. 10).

By the user's state determining process (FIGS. 11, 12) as described above, the CPU 10 determines each state relatively accurately based on the measured data of the triaxial acceleration sensor 16.

Each state is one of when a user is walking, running, in other state (when the navigation device 1 is held in a hand of user or the like), stopping, traveling by a car and traveling by a train.

Further, by the above described positioning process (FIG. 10) including the user's state determining process, the CPU 10 accumulates appropriate traveling history data by carrying out the selecting of positioning method and selecting of positioning parameter according to each traveling state.

As described above, the navigation device 1 of the embodiment determines the transportation option based on the level of the low-frequency component of acceleration in the lateral direction (the direction perpendicular to the traveling direction in a horizontal plane) with respect to the traveling direction in the output of the acceleration sensor.

Therefore, the navigation device 1 can accurately discriminate between a transportation option that travels freely on roads such as a car and a transportation option that travels on rails such as a train.

Moreover, the navigation device 1 extracts the frequency component between 1 Hz and 3 Hz as the above low-frequency component to use for the discrimination of transportation options. Therefore, the discrimination between a car and a train can be made clearly.

Here, because a difference between riding in a car and riding on a train is apparent even when a frequency component in any range within the range of 0.5 Hz to 10 Hz is extracted to use for the discrimination of transportation options, the navigation device 1 can discriminate between riding in a car and riding on a train when a frequency component in any range within the range of 0.5 Hz to 10 Hz is extracted and use for the discrimination of transportation options.

Further, according to the navigation device 1 of the embodiment, the discrimination between traveling and stopping of the transportation option is carried out based on the level of the low-frequency component of the vertical direction acceleration in the output of the acceleration sensor, and the above discrimination of the type of the transportation option is carried out while traveling.

Therefore, incorrectly discriminating the type of the transportation option while the transportation option is stopping can be avoided in the navigation device 1.

Moreover, according to the navigation device 1 of the embodiment, the vertical direction is set according to the detection of the gravitational acceleration.

Further, in the navigation device 1, the traveling direction and the lateral direction (the direction perpendicular to the traveling direction in a horizontal plane) are set according to the change in acceleration at the time of stopping and starting of the transportation option when the variance of walking is not shown in the acceleration, and a component of each of the above directions is to be extracted.

Therefore, each of the direction components can be accurately extracted from the outputs of the triaxial acceleration sensor 16 even in the portable navigation device 1 in which the direction of the device is not fixed, and the extracted direction components can be used for the above discrimination of the transportation options.

Moreover, the navigation device 1 of the embodiment can discriminate whether walking or running is carried out while the navigation device 1 is being worn or retained on the body of a user or walking or running is carried out while the navigation device 1 is being held in a hand of a user by comparing the varying cycle of the vertical direction acceleration and the varying cycle of a horizontal direction acceleration when a user is walking or running.

Thereby, the navigation device 1 can switch appropriately so as to carry out the positioning by autonomous navigation according to walking or running when the navigation device 1 is in a state being worn or retained on the body or a user and so as to carry out the positioning by GPS and stopping the positioning by autonomous navigation when the navigation device 1 is in a state being held in a hand of a user.

Further, the navigation device 1 of the embodiment carries out the above discrimination of the wearing state after confirming that the peaks of the vertical direction acceleration are equal to or greater than "1G+α" which indicates walking or running.

Therefore, inaccurately determining the state by carrying out the above discrimination of the wearing state while traveling on a transportation option, for example, can be avoided in the navigation device 1.

Moreover, in the embodiment, discrimination between walking and running is carried out based on the variable frequency of acceleration when it is determined that the navigation device 1 is worn or retained on the body of a user.

Further, the navigation device 1 carries out the discrimination between walking and running based on the peaks of the vertical direction acceleration only when the variable frequency of acceleration is between the two ranges.

Therefore, the navigation device 1 can discriminate between walking and running relatively accurately.

Here, the present invention is not limited to the above embodiment and various changes can be made.

For example, in the above embodiment, an example in which the result of the user's state determination is used for selecting the positioning method is shown. However, the result of the state determination can be sued for various types of objects.

For example, based on the determination result of whether the traveling is by a car or the traveling is by a train, which traveling rout was traveled by which transportation option can be confirmed afterwards and also, the determination result can be used to display the traveling rout in which the traveling by a car and the traveling by a train are discriminated.

Further, when the positioning by autonomous navigation can be carried out by other method even when the navigation device 1 is held in a hand of a user, the configuration may be that the positioning by autonomous navigation is carried out in a method corresponding to each of the case where it is determined that the navigation device 1 is worn or retained on the body of a user and the case where it is determined that the navigation device 1 held in a hand of a user.

Furthermore, the discrimination result of discriminating between the traveling by walking, by running and by riding on a transportation option may be used for obtaining the energy used by a user.

Moreover, in the above embodiment, an example of obtaining the vertical direction, the traveling direction and the lateral direction (the direction perpendicular to the traveling direction in a horizontal plane) based on the output of the triaxial acceleration sensor 16 and the triaxial terrestrial magnetism sensor 15 is shown.

However, for example, when it is known that the device is to be worn by a user in a predetermined direction, the vertical direction, the traveling direction and the lateral direction (the direction perpendicular to the traveling direction in a horizontal plane) may be obtained by using this direction information.

Further, in the above embodiment, only an example is shown for each of the threshold value "1G+α" of peak of the vertical direction acceleration which discriminated between walking and running, the first range (equal to or smaller than 2.3 Hz) and the second range (equal to or greater than 2.6 Hz) of varying cycle of acceleration which discriminated between walking and running, the threshold value "2G" of peak of acceleration which discriminates between walking and running when the varying cycle of acceleration is in between the two ranges. These values are not limited to the above examples.

Furthermore, the detailed configuration and the detailed method shown in the embodiment can be arbitrarily changed within the scope of the invention.

The present U.S. patent application claims a priority under the Paris Convention of Japanese Paten Application No. 2010-111625 filed on May 14, 2010 and Japanese Patent Application No. 2010-249322 filed on Nov. 8, 2010, which shall be a basis of correction of an incorrect translation.

What is claimed is:

1. A traveling state determining device which determines a traveling state of a user, comprising:
    an acceleration sensor which detects accelerations of a plurality of directions and outputs the accelerations of the plurality of directions as frequency components of a plurality of types;
    a specific acceleration extracting unit which extracts an acceleration of a lateral direction component, which is lateral with respect to a traveling direction and which is a predetermined frequency component from the output of the acceleration sensor;
    a traveling determining unit which determines whether the user is traveling or stopped based on a result of comparing a level of an acceleration of a vertical direction component, which is a low frequency component from the output of the acceleration sensor, to a first threshold value;
    a constant speed traveling determining unit which determines whether the traveling state is a constant speed state based on (i) a determination result indicating that the user is traveling obtained by the traveling determining unit and (ii) an acceleration of a traveling direction component from the output of the acceleration sensor; and
    a state determining unit which, when the constant speed traveling determining unit determines that the traveling state is the constant speed state, determines whether the traveling state is (i) by a transportation option which travels on rails or (ii) by a transportation option which travels on roads based on a level of the acceleration which is extracted by the specific acceleration extracting unit.

2. The traveling state determining device as claimed in claim 1, further comprising:
    a direction setting unit which (i) sets a direction in which a gravitational acceleration is always provided in the output of the acceleration sensor as a vertical direction, (ii) detects an acceleration that expresses starting and stopping to set an acceleration direction of the detected acceleration as the traveling direction, and (iii) sets a direction which is perpendicular to the vertical direction and the traveling direction as the lateral direction;
    wherein the specific acceleration extracting unit extracts the acceleration of the lateral direction component based on the settings of the direction setting unit.

3. The traveling state determining device as claimed in claim 1, wherein when the traveling determining unit determines that the user is traveling, the state determining unit compares the level of the acceleration which is extracted by the specific acceleration extracting unit to a second threshold value, and determines between the states based on a result of the comparison.

4. The traveling state determining device as claimed in claim 1, wherein the predetermined frequency component is a frequency component which is included in a range of 0.5 Hz to 10 Hz.

5. A traveling state determining method for determining a traveling state of a user by using an acceleration sensor which detects accelerations of a plurality of directions and outputs the accelerations of the plurality of directions as frequency components of a plurality of types, the method comprising:
    extracting a specific acceleration of a lateral direction component which is lateral with respect to a traveling direction and which is a predetermined frequency component from the output of the acceleration sensor;
    determining whether the user is traveling or stopped based on a result of comparing a level of an acceleration of a vertical direction component, which is a low frequency component from the output of the acceleration sensor, to a first threshold value;
    determining whether the traveling state is a constant speed state based on (i) a determination result indicating that the user is traveling and (ii) an acceleration of a traveling direction component from the output of the acceleration sensor; and
    when it is determined that the traveling state is the constant speed traveling state, determining whether the traveling state is (i) by a transportation option which travels on a rail or (ii) by a transportation option which travels on a road based on a level of the specific acceleration extracted in the extracting.

6. A non-transitory computer-readable recording medium having a program recorded thereon for controlling a computer to determine a traveling state of a user, wherein the computer is provided with an output of an acceleration sensor which detects accelerations of a plurality of directions and outputs the accelerations of the plurality of directions as frequency components of a plurality of types, and wherein the program controls the computer to perform functions comprising:

extracting a specific acceleration that is an acceleration of a lateral direction component which is lateral with respect to a traveling direction and which is a predetermined frequency component from the output of the acceleration sensor;

determining whether the user is traveling or stopped based on a result of comparing a level of an acceleration of a vertical direction component, which is a low frequency component from the output of the acceleration sensor, to a first threshold value;

determining whether the traveling state is a constant speed state based on (i) a determination result indicating that the user is traveling and (ii) an acceleration of a traveling direction component from the output of the acceleration sensor; and when it is determined that the traveling state is the constant speed state, determining whether the traveling state is (i) by a transportation option which travels on a rail or (ii) by a transportation option which travels on a road based on a level of the specific acceleration extracted in the extracting.

\* \* \* \* \*

UNITED STATES PATENT AND TRADEMARK OFFICE
CERTIFICATE OF CORRECTION

PATENT NO. : 8,862,427 B2  
APPLICATION NO. : 13/107099  
DATED : October 14, 2014  
INVENTOR(S) : Satoshi Sakuraoka Page 1 of 1

It is certified that error appears in the above-identified patent and that said Letters Patent is hereby corrected as shown below:

In the Claims

Column 18, line 57 (Claim 5, Line 21):

after "speed" delete "traveling".

Signed and Sealed this
Fourteenth Day of April, 2015

Michelle K. Lee
*Director of the United States Patent and Trademark Office*